May 25, 1943.  D. R. BERLIN ET AL  2,319,843
ENGINE COWLING SUPPORT
Filed June 14, 1939  2 Sheets-Sheet 1
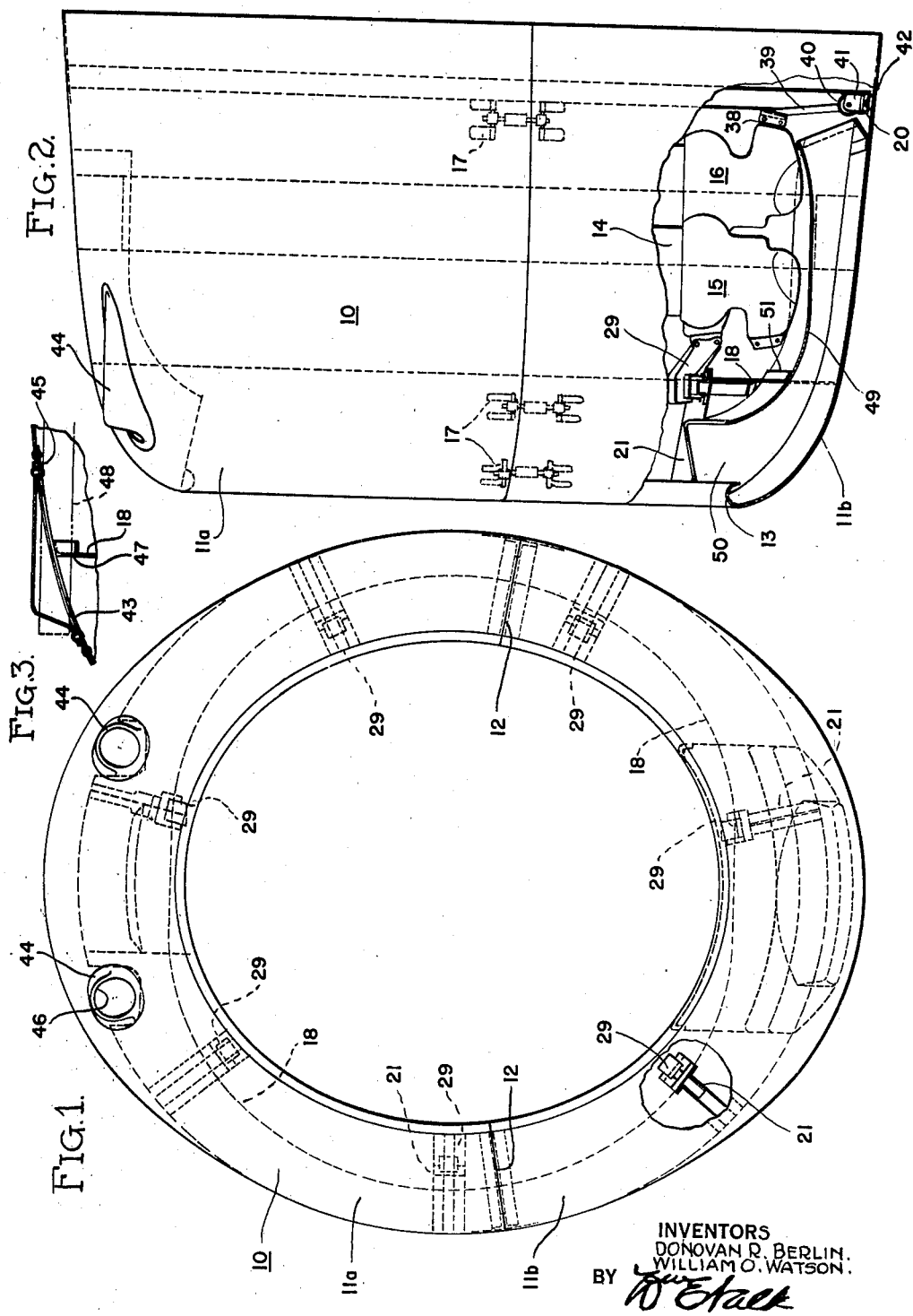
INVENTORS
DONOVAN R. BERLIN.
WILLIAM O. WATSON.
BY
ATTORNEY

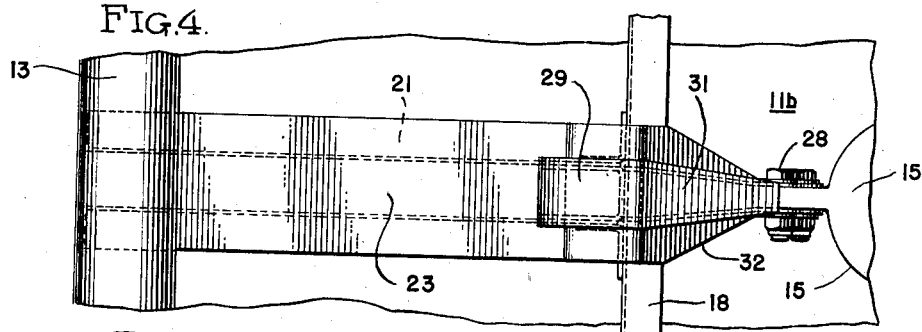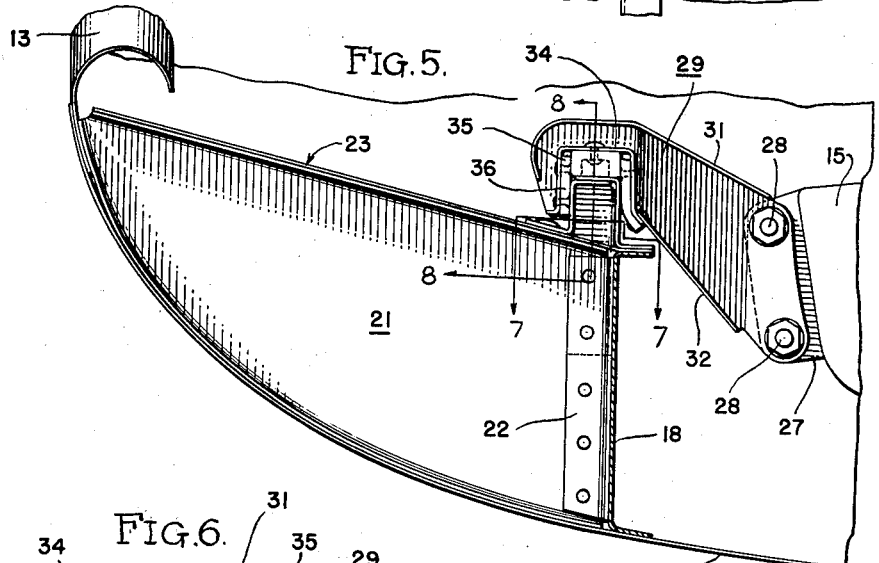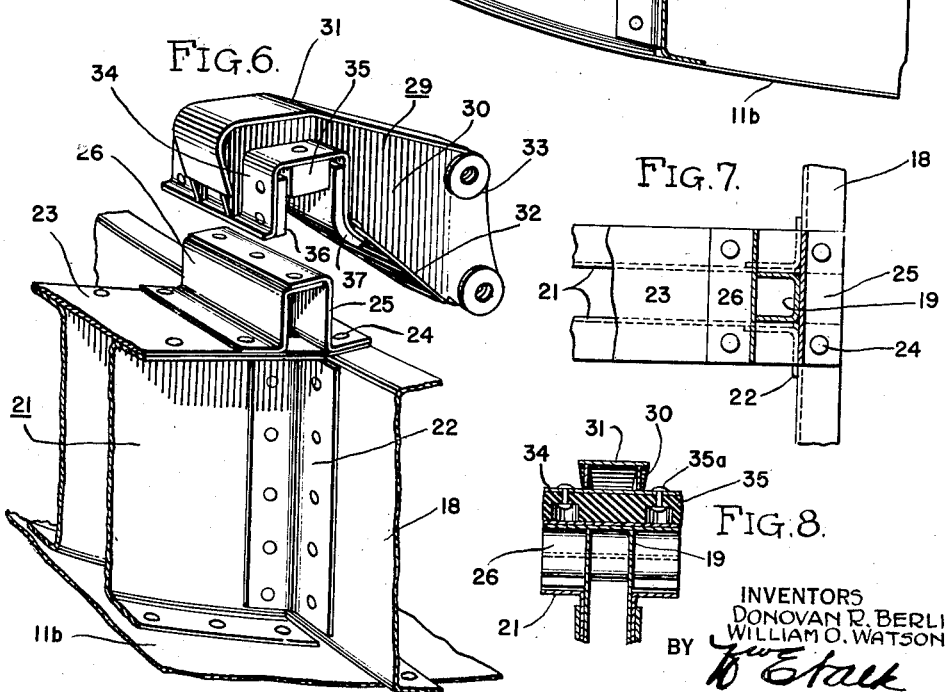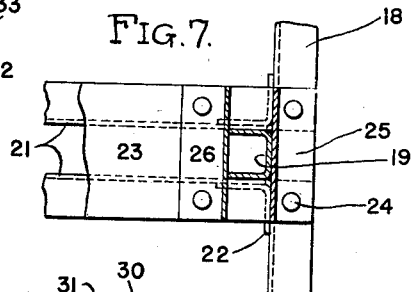

Patented May 25, 1943

2,319,843

UNITED STATES PATENT OFFICE 2,319,843

ENGINE COWLING SUPPORT

Donovan R. Berlin, Eggertsville, and William O. Watson, Kenmore, N. Y., assignors to Curtiss-Wright Corporation, a corporation of Delaware Application June 14, 1939, Serial No. 279,070

6 Claims. (Cl. 123—171)

The present invention relates to cowlings for engines and more particularly to the method and means for mounting cowl rings on air-cooled aircraft engines of the double-row radial type.

An object of this invention is the provision of an improved cowl of the ring type which is resiliently supported by an engine, while not actually attached or fixed thereto, and more particularly to radial engines having more than one bank of cylinders. Another object resides in the provision of a split cowl ring which is readily and detachably clamped to an engine and is floatingly supported thereon such that fore and aft axial and torsional forces exerted upon the cowl are resiliently absorbed by a novel mounting arrangement instead of being transmitted directly to the engine.

A further object is the provision of a cowl ring mounting which absorbs the expansion and contraction of the engine in a radial direction under its different temperature conditions, without the forces which are thereby developed being transmitted into the enclosing cowl. Among other objects are the provision in such cowls of faired apertures to accommodate gun barrels to reduce aerodynamic drag and to provide internal fresh air scoops and ducts.

Further objects of the invention will become apparent from the reading of the following specification and the accompanying drawings forming a part hereof, in which:

Fig. 1 is a front elevation of the improved cowl;

Fig. 2 is a side elevation of the same partly broken away at its bottom portion;

Fig. 3 is a side elevational cross-section taken through the gun barrel fairing;

Fig. 4 is a radial view of a cowl mounting support;

Fig. 5 is a side elevational view of the same;

Fig. 6 is a perspective view of the separated halves of the said support;

Fig. 7 is a cross-section taken along lines 7—7 of Fig. 5; and

Fig. 8 is a cross-section taken along lines 8—8 of Fig. 5.

The present invention is an improvement upon that type of N. A. C. A. cowl disclosed in Patent No. 1,966,043, issued July 10, 1934, to Geo. A. Page et al., and relates more particularly to the manner of its support upon a twin row radial engine.

Referring now to Fig. 1 it will be seen that the cowl 10 is composed of two complementary portions, the upper part 11a meeting the lower part 11b along the radially extending flanged joints 12 at points somewhat below the horizontal center line of the cowl. The sheets forming the wall of each portion form a forwardly tapering cowl of elliptical cross-section having greater vertical depth than width and being tapered more sharply near its leading edge which is rolled over to present a semi-circular nosing at 13. The nosing defines a frontally exposed area for the entry of cooling air, being also elliptical but more nearly circular than at the trailing, or skirt portion of the cowl.

The cowl portions enclose an air-cooled engine 14 of the twin, or two-row radial type having front and rear banks of cylinders 15 and 16 respectively. The two cowling portions are preferably attached to each other by a plurality of readily detachable turnbuckles of any suitable type such as shown in the aforementioned Page et al. patent. Each cowl portion is reenforced by the transverse frames or formers 18 and 20, the portions of each frame being fastened to its respective cowl wall portion and abutting its complementary half at the joints 12. The transverse frame or bulkhead 18 is formed from a plate, substantially semi-annular in front elevation and provided with bent over flanges, the outer of which is riveted or welded to the respective cowl walls 11a or 11b.

At substantially equally spaced distances around the wall of the cowl, radially extending plate supports 21 are flanged and attached to the nose portion of the cowl, being connected to the bulkhead 18 by the framing angles or clips 22, and attached to a channel element 19 disposed between the webs of plates 21, being also suitably attached to the web of the bulkhead 18. The plate supports 21 form channels disposed in back-to-back relationship with their web portions spaced apart and having a top plate 23 riveted to their inner flanges. The plate 23 extends beyond the ends of the said channel supports 21 and is riveted to the rearwardly extending inner flange of the bulkhead 18 as by the rivets 24, which also serve to attach the base leg of one of the two Z-bar sections 25 and 26 which when assembled forms a hat-shaped bearing element with its upper bearing surface extending transversely in a plane normal to a radial line from the center of the cowl. The aforementioned elements 18 to 26 inclusive are each permanently attached to their respective cowl wall portions and form the detachable, or removable, portions of the cowl supporting structure. Certain of the forward bank of the engine cylinders 15 are provided adjacent their rocker-box portions with integrally cast lugs or ears 27 extending forwardly and in radial planes coincident with the central radial planes of the removable channel support assemblies 21.

The ears 27 are provided with transversely extending openings to receive fastening bolts 28 which attach to the ears the fixed built-up bracket assemblies 29. These bracket assemblies are formed of spaced side wall plates 30 to which top and bottom plates 31 and 32 respectively, are welded or otherwise fastened. The spaced radially extending plates 30 have welded thereto suitable apertured washers or bosses 33 to provide suitable bearing area for the mounting bolts 28.

Bracket assembly 29 is provided with a channel-shaped bent plate 34 conforming substantially to the general profile of the aforementioned hat-shaped channel members 25—26 and having its web portions extending parallel to the latter but spaced therefrom. The outer surfaces of the channel 34 are welded or otherwise suitably fastened to the webs of the channel plates 30 and to the inner faces of the channel 34 are suitably attached resilient material, fore and aft fabric liners 36 and 37 and the transverse rubber cushions 35. Each of these cushions are of somewhat narrower width than the space between the liners 36 and 37 such that when the two halves of the cowl 10 are drawn together in assembled relationship by means of the turnbuckles 17 the bearing channel 25 and 26 is forced within the channel 34 and against the resilient pads 35 which are permitted to spread laterally toward the liners when compressed. The attachment fastenings of the elements 35, 36 and 37 are suitably countersunk or counterbored to permit the inner channel to bear against and compress the resilient material without directly contacting the fastening devices which would transmit the forces other than through the elastic and fabric materials.

The rear frame member 20 disposed adjacent the trailing edge of the cowl 10 is formed of a channel-shaped section having inwardly or radially extending flanges and with its web portion bent to conform to the elliptical cross-section of the cowl at that particular transverse plane. The rocker-box portions of the rear bank of engine cylinders 16 are provided with integrally cast lugs or ears 38, similar to the ears 27 being similarly apertured to accommodate the fastening bolts for the brackets 39. The outer ends of the latter brackets are attached through rubber or other elastic bushings 40 to the apertured fittings 41 which are attached to the rear channel bulkhead 20, the latter in turn being spaced from the walls of the cowl by means of the fastening rivets passing through the washers 42, which prevent chafing between the ring and the channel. The supports 38—42 serve to floatingly aline the cowl axis with that of the engine.

It will therefore be seen that all fore and aft stresses transmitted to the cowl due to the relative airstream by virtue of forward flight or from other causes are restrained by the liners 37, and axial movement of the cowl in the opposite direction is similarly restrained by the front liners 36. Attachment of the cowl halves together on the engine causes initial spreading or widening of the rubber cushions 35 and subsequent further expansion of the engine due to increases in temperature causes further compression of the resilient cushions against the bearing block 25—26 and prevents the transmission of these forces into the cowl, arresting any tendency to distort the shape thereof. The cushions 35 also serve to absorb torsional stresses which might be transmitted to the cowl as a result of its being swept by the rotating slipstream of the propeller which is ordinarily augmented in the case of a cowl of the present shape due to its elliptical cross-section. The arrangement of supporting the cowl in the manner shown with the main bulkhead forward of the first bank of cylinders and the resilient absorption of radial stresses by the rubber cushions and the restraining of fore and aft forces by the fabric pads of lesser resilience has resulted in a very satisfactory cowl and support.

The upper portion of the cowl half 11a is provided with openings 43 around the outside of which are riveted the fairing pieces 44 to the inner reenforcing member 45. The fairing 44 is also provided with an opening 46 and the bulkhead 18 has a recessed portion as at 47 to permit the barrel 48 of a fixed gun to project through the cowl for forward firing between the propeller blades. The fairing shape and its relationship to the cowl has been found to materially reduce the aerodynamic drag of the exposed gun barrel.

The lower portion of the cowl half 11b is provided with a sheet member 49 channel shaped in cross-section and substantially arcuate lengthwise, its sides being flanged and riveted to the cowl wall to form a fresh air inlet duct 50 suitable for the carburetor intake or other engine accessories. The mouth of the duct is directed inwardly to receive the radial air blast from the inner portions of the propeller blades. The bulkhead 18 is suitably formed to fit around and be attached to the duct wall 49 as at 51.

We claim:

1. In aircraft having an engine including front and rear rows of radially disposed cylinders, the combination with a cowl surrounding said cylinders subjected to axial and radial forces with respect to its longitudinal axis, of a cowl support structure including supporting means carried by certain of the said front engine cylinders comprising forwardly and outwardly opening bifurcated portions having resilient elements on the inner faces and fabric elements on the fore and aft faces of said portions, bearing means associated with said cowl adapted to engage said supporting elements, support members associated with said rear row of cylinders pivotally attached to a trailing portion of said cowl, whereby the said cowl is resiliently secured to and around said engine, and axial and radial displacements of said cowl relative to said engine is resiliently restrained.

2. In aircraft having an engine including at least two rows of radially disposed cylinders, the combination with a split cowl surrounding said cylinders subjected to axial, radial and circumferential forces with respect to its longitudinal axis, of a cowl support structure including forwardly extending supporting means carried by the forward row of cylinders comprising outwardly extending bifurcated portions having resilient elements on the inner faces and fabric elements on the fore and aft faces of said portions, bearing means associated with said cowl adapted to engage said elements, and further means carried by the engine resiliently supporting the rear portion of said cowl, whereby the cowl is resiliently secured to and around said engine, and radial and circumferential displacements of said cowl with respect to said engine are resiliently cushioned and axial displacements are less resiliently restrained.

3. In aircraft having an engine including at least two rows of radially disposed cylinders, the combination with a split cowl surrounding said cylinders subjected to axial and radial forces with respect to its longitudinal axis, of a cowl support structure including supporting means carried by the forward row of said cylinders comprising forwardly and outwardly opening bifurcated portions having resilient elements on the outwardly exposed faces of said portions, bearing means associated with said cowl adapted to engage said elements, and further means carried by the engine resiliently supporting the rear portion of said cowl, whereby the cowl is resiliently secured to and around said engine.

4. In aircraft having a radial engine, the combination with a cowl surrounding said engine subjected to radial and circumferential movements with respect to its longitudinal axis, of a cowl support including an engine-supported bracket having an outwardly opening bifurcated portion, inwardly extending means carried by said cowl adapted to engage said bifurcated portion, resilient means carried by said bifurcated portion against which the said inwardly extending means is adapted to bear, the plane of such resilient contact surface extending tangentially with respect to a transverse circle having the longitudinal axis of said engine as its center whereby radial and circumferential movements between said cowl and said engine are resiliently restrained.

5. In aircraft having a radial engine, the combination with a co-axially disposed cowl subjected to axial and radial forces with respect to its longitudinal axis, said cowl enclosing said engine and having its nose portion extending forwardly therefrom, of a cowl support including an inwardly extending transverse bulkhead of annular shape disposed between said cowl nose and said engine, a radially disposed web connecting said bulkhead with said cowl nose, the opening within said bulkhead being smaller than the corresponding transverse dimensions of the engine, tangentially disposed resilient supporting elements carried by said engine, complementary supporting elements jointly carried by said bulkhead and web adapted to engage said first elements whereby the cowl nose portion is resiliently secured to and around said engine.

6. In aircraft having a radial engine, the combination with a co-axially disposed cowl enclosing said engine subjected to radial and torsional forces with respect to its longitudinal axis, of a cowl support including a plurality of forwardly extending cowl supporting means carried by said engine, adjacently disposed complementary means carried by said cowl, resilient elements disposed intermediate both said means and arranged such that their longest dimension extends tangentially to a transverse circle concentric with said engine axis and of a diameter appreciably less than the overall diameter of said engine, whereby the said elements resiliently oppose relative displacements in both radial and circumferential directions between said engine and said cowl.

DONOVAN R. BERLIN.
WILLIAM O. WATSON.